(12) United States Patent
Hegg et al.

(10) Patent No.: US 11,194,067 B1
(45) Date of Patent: Dec. 7, 2021

(54) HIGHLY ADAPTABLE SEISMIC SOURCE

(71) Applicants: Frederick Allen Hegg, Marstons Mills, MA (US); Joseph Alan Sparks, North Attleborough, MA (US)

(72) Inventors: Frederick Allen Hegg, Marstons Mills, MA (US); Joseph Alan Sparks, North Attleborough, MA (US)

(73) Assignee: Falmouth Scientific Incorporated, Cataumet, MA (US)

( * ) Notice: Subject to any disclaimer, the term of this patent is extended or adjusted under 35 U.S.C. 154(b) by 352 days.

(21) Appl. No.: 16/357,447

(22) Filed: Mar. 19, 2019

Related U.S. Application Data

(60) Provisional application No. 62/691,174, filed on Jun. 28, 2018.

(51) Int. Cl.
*G01V 1/155* (2006.01)
*G01V 1/02* (2006.01)
*G10K 9/12* (2006.01)
*G01V 1/38* (2006.01)

(52) U.S. Cl.
CPC ............. *G01V 1/155* (2013.01); *G01V 1/159* (2013.01); *G10K 9/121* (2013.01); *G01V 1/3861* (2013.01)

(58) Field of Classification Search
CPC ......... G01V 1/155; G01V 1/159; G10K 9/121
See application file for complete search history.

(56) References Cited

U.S. PATENT DOCUMENTS

| 3,522,862 | A | 8/1970 | Lister |
| 3,670,839 | A | 6/1972 | Savit |
| 3,679,021 | A | 7/1972 | Goldberg |
| 5,894,451 | A | 4/1999 | DeJaco et al. |
| 6,488,117 | B1 | 12/2002 | Owen |
| 6,570,819 | B1 | 5/2003 | Clark et al. |
| 2013/0163387 | A1* | 6/2013 | Mandal ................. G01V 1/159 367/190 |

FOREIGN PATENT DOCUMENTS

EP 3093841 A1 * 11/2016 ............. G10K 9/121

* cited by examiner

*Primary Examiner* — Ian J Lobo
(74) *Attorney, Agent, or Firm* — David M. Driscoll, Esq.

(57) ABSTRACT

An adaptable seismic source system that includes a first seismic source having at least one moving plate and a second seismic source also having at least one moving plate. Each of the moving plates of the first and second seismic sources creating a pressure wave. Each seismic source is comprised of a fixed center plate having opposed sides and a pair of movable plates that are arranged at respective opposed sides of the center plate; a coupling member that is disposed between the first and second seismic sources for enabling a sliding action between the first and second seismic sources and a controller coupled with the first and second seismic sources for exciting the seismic sources to provide a combined output with a lower frequency spectrum.

19 Claims, 14 Drawing Sheets

Dual Source 2x travel distance

Quad Source 4x travel distance

Single Source 1x travel distance

Triple Source 3x travel distance

HIGHLY ADAPTABLE SEISMIC SOURCE

RELATED CASES

Priority for this application is hereby claimed under 35 U.S.C. § 119(e) to commonly owned and U.S. Provisional Patent Application No. 62/691,174 which was filed on Jun. 28, 2018 and which is incorporated by reference herein in its entirety.

FIELD OF THE INVENTION

The present invention relates in general to an improved seismic source. More particularly the present invention pertains to an improved seismic source that is adaptive. Even more particularly the present invention pertains to an improved seismic source that is adaptive in that it allows a broad spectrum of acoustic energy generation from essentially a single source or acoustic system.

BACKGROUND OF THE INVENTION

Seismic surveys utilize a variety of systems to achieve the penetration and resolution results needed for a particular survey requirement. The requirements can vary from just a few meters for cable routes and environmental assessments to a few kilometers for offshore oil exploration and reservoir monitoring.

The earth's sediments act as a natural low pass filter thus the further the acoustic pulses need to penetrate into the earth or the seabed the lower the frequency required to do so. This phenomenon thus forces a trade-off among the various types of systems regarding depth of penetration and system resolution. Examples of these systems are shown in FIG. 1 and include pingers, chirp systems, boomers, bubble pulsers, sparkers and air guns. The chirp systems, pingers, boomers, bubble pulsers and the Bubble Gun™ (Hegg Marine Solutions identified as the HMS-620 Bubble Gun) are all "bubble less" forms of acoustic energy generation and are the focus of this invention.

Currently several systems may be required to get the desired resolution and depth of penetration for a given survey requirement (see table 1).

TABLE 1

| System Type | Frequency | Resolution | Penetration |
| --- | --- | --- | --- |
| Chirp | 500 Hz-25 KHz | 3.5 cm-20 cm | 5 m-50 m |
| Pinger | 2 Khz-15 KHz | 10 cm-20 cm | 5 m-40 m |
| Boomer | 300 Hz-6 KHz | 20 cm-50 cm | 20 m-150 m |
| Sparker | 200 Hz-3 KHz | 30 cm-1 m | 30 m-750 m |
| Air Guns | 10 Hz-3 KHz | 50 cm-1 m | 30 m-1000 m plus |
| Bubble Gun ™ | 20 Hz > 2 KHz | 30 cm-50 cm | 30 m-500 m |

Current "bubble less" systems typically have one or more moving surfaces or plates for an acoustic seismic source. These devices can be piezoelectric (pingers and chirps), electrostatic (boomers), electromechanical (bubble pulsers and Bubble Gun™), electromagnetic and magnetostrictive. These systems operate in one frequency band which they are designed for given the source or transducer design.

SUMMARY OF THE INVENTION

The highly adaptive seismic source of the present invention is able to span several frequency bands and depth of penetration requirements on the fly without the need to change systems or acoustic arrays. The source would also produce energy in the low end of the frequency spectrum typically only produced by sources that do generate bubbles such as sparkers and air guns. This broad spectrum of acoustic energy generation would allow it to fit a multitude of survey applications with a single source or system.

The highly adaptive seismic source of the present invention enables switching on the fly between separate frequency bands of operation from a single source. This allows a single instrument to cover a wider range of geophysical applications that can be either under water or land based. A series of potential seismic sources is depicted in FIG. 4. Regardless of the method of pulse generation, one or more of the plates move thus creating a pressure wave which then travels through the water and or the earth's sediments and are reflected by any density changes in these under lying sediments. The resulting reflections are recorded and processed in a variety of ways based on the survey requirements. The received data may be acquired either with towed or fixed mounted multi-channel or single channel streamer arrays for ocean and inland waterway applications or with geophones or three axis accelerometer based devices for land applications. By adding multiple sources in a series configuration, the additional sources can be coupled together and switched in when needed. The result of this coupling is that the moving plates in the combined source travel over a greater distance thus creating a longer wavelength pressure wave. This longer wavelength pressure wave has a lower frequency spectrum thus allowing the acoustic signals to penetrate deeper into the earth's sediments for applications requiring this capability. This flexibility allows the adaptive source to cover ranges of system frequency bands and penetration depths for pingers, boomers, sparkers and small air guns with a single source instrument without the need for compressors or extremely high voltages as required by bubble generating acoustic systems like air guns and sparkers. This also reduces the need for multiple systems to perform surveys with multiple depth and resolution requirements. The acoustic signature of the seismic source of the present invention is much more repeatable than bubble generating types of systems such as sparkers and air guns and can be utilized for enhanced processing techniques to improve the signal to noise of the reflected signals.

In accordance with the present invention there is provided an adaptable seismic source system that is comprises of a first seismic source having at least one moving plate; a second seismic source also having at least one moving plate; wherein each of the moving plates of the first and second seismic sources creating a pressure wave; and a controller coupled with the first and second seismic sources to provide a combined output with a lower frequency spectrum.

In accordance with other aspects of the present invention each seismic source is comprised of a fixed center plate having opposed sides and a pair of movable plates that are arranged at respective opposed sides of the center plate; each seismic source further includes support rods coupled between the fixed center plate and the respective movable plates to enable the moveable plates to move relative to the fixed center plate; each seismic source further includes biasing springs associated with each support rod so as to enable the coupling of energy between the seismic sources.

In accordance with the present invention there is also provided an adaptable seismic source system that is comprised of a first seismic source having at least one moving plate; a second seismic source also having at least one moving plate; each of the moving plates of the first and second seismic sources creating a pressure wave; a coupling member for connecting the first and second seismic sources; a first driver for driving only the first seismic source to provide from the seismic sources a first frequency spectrum and a second driver for driving both the first and second seismic sources in parallel to provide from the seismic sources a second frequency spectrum that is different than the first frequency spectrum; and a controller coupled with the first and second seismic sources to provide a combined output with a lower frequency spectrum, and with the seismic sources being disposed in parallel to provide from the seismic sources a second frequency spectrum that is different than the first frequency spectrum.

In accordance with the present invention there are provided source arrays that can be configured into any number of subsets and or into any number of subsets of a larger array typically used in offshore seismic source configurations. The following are significant aspects.

The sources can be depth compensated to produce a constant depth invariable signature.

The depth compensation can be via air, gas or fluid within the source.

The source arrays could be arranged vertically or horizontally in the water column.

The sources may be used in ocean, coastal and inland water ways as well as on land using natural and manmade coupling configurations.

The installation configurations can be mobile survey configurations or fixed monitoring configurations.

The sources can be triggered simultaneously, sequentially or in other coded sequences.

The sources can be driven using a triggered discharge mechanism or continuously driven via an amplifier or other linear electrical techniques.

The sources could be driven via piezoelectric, electrostatic, electromagnetic, magnetostrictive or electromechanical techniques.

The sources could be fixed mount to the hull of a surface or subsurface vessel.

The source mounting plates can be in a fixed or floating configuration.

The base source plates are scalable to allow changes in the fundamental frequency of the source elements.

In accordance with the claimed invention there is provided in various embodiment herein an adaptable seismic source system comprising: a first seismic source having at least one moving plate; a second seismic source also having at least one moving plate; each of the moving plates of the first and second seismic sources creating a pressure wave; wherein each seismic source is comprised of a fixed center plate having opposed sides and a pair of movable plates that are arranged at respective opposed sides of the center plate; a coupling member that is disposed between the first and second seismic sources for enabling a sliding action between the first and second seismic sources; and a controller coupled with the first and second seismic sources for exciting the seismic sources to provide a combined output with a lower frequency spectrum.

In accordance with other aspects of the present invention the coupling member comprises at least one support rod; the coupling member includes a plurality of support rods; the coupling between the fixed center plate and the respective movable plates enables the moveable plates to move relative to the fixed center plate; the plurality of support rods are disposed substantially transverse to the moveable plates; the plurality of support rods are disposed in a spaced array about a perimeter of the moveable plates; each seismic source further includes biasing springs associated with each support rod so as to enable the coupling of energy between the seismic sources; each seismic source further includes biasing springs associated with each support rod so as to enable the coupling of energy between the seismic sources; the biasing springs include both compression and tension springs; the biasing springs include a single compression spring that is disposed between facing plates of the respective first and second seismic sources; the biasing springs further include a pair of tension springs that are disposed respectively outboard of each of the first and second seismic sources; further including an excitation coil for each seismic source; the excitation coil is disposed within a plane of the fixed center plate; including a filler material between the moveable plates.

In accordance with another embodiment of the present invention there is provided an adaptable seismic source system comprising: a first seismic source having at least one moving plate; a second seismic source also having at least one moving plate; each of the moving plates of the first and second seismic sources creating a pressure wave; a coupling member for connecting the first and second seismic sources; a first driver for driving only the first seismic source to provide from the seismic source a first frequency spectrum and a second driver for driving both the first and second seismic sources in parallel to provide from the seismic sources a second frequency spectrum that is different than the first frequency spectrum; and a controller coupled with the first and second seismic sources to provide a combined output with a lower frequency spectrum.

In accordance with other aspects of the present invention each of the drivers includes an excitation coil and the coupling member extends between the seismic sources; the coupling member includes a plurality of support rods and coil springs that are disposed about each support rod; and the coil springs include a single compression spring that is disposed between facing plates of the respective first and second seismic sources; and wherein the coil springs further include a pair of tension springs that are disposed respectively outboard of each of the first and second seismic sources.

In accordance with still another embodiment of the present invention there is provided an adaptable seismic source system comprising: an input drive terminal; an array that includes a first seismic source having at least one moving plate and an excitation element, and a second seismic source also having at least one moving plate and an excitation element; each of the moving plates of the first and second seismic sources creating a pressure wave; a coupling member for physically connecting the first and second seismic sources; a first source driver; a second source driver; and a source selector that is disposed in series with the second source driver for either coupling the input drive to the second source driver or impeding the input drive to the second source driver.

In accordance with still other aspects of the present invention the input terminal receives a trigger input and each of the source driver is an impulse source driver; and wherein, in one mode, the input trigger signal excites only the first seismic source; and in another mode, the input trigger signal excites both the first and second seismic sources.

BRIEF DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which.

DESCRIPTION OF THE PREFERRED EMBODIMENTS

The following is a description in detail of the embodiment using existing technology and is in no way limited to the description and is provided only as supplemental information to the aforementioned claims.

Figure 3:
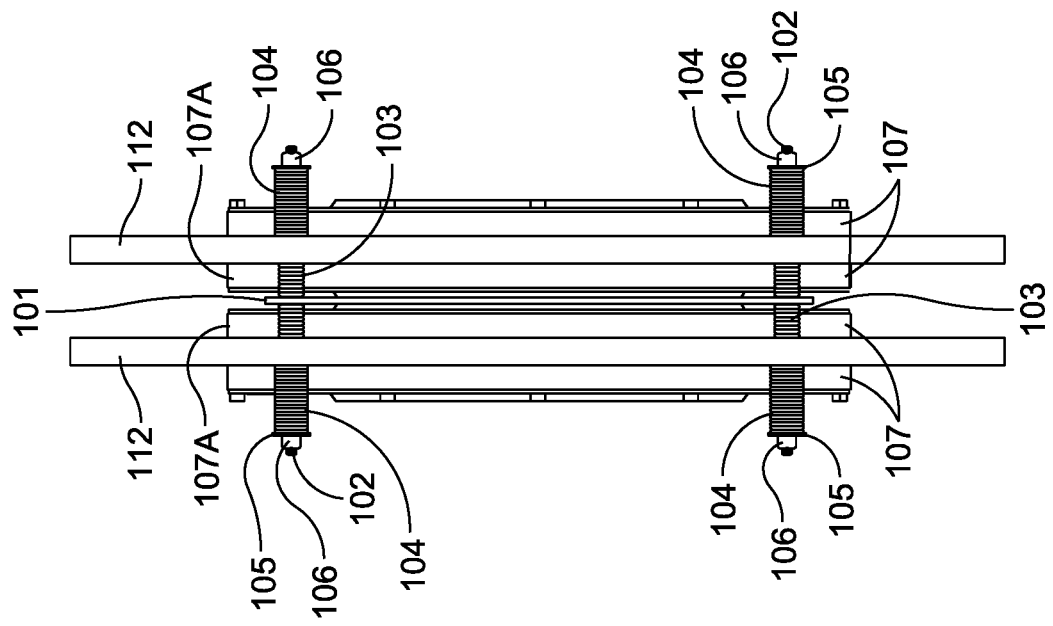
FIG. 3 is a side elevation view of an adaptable seismic source of the present invention as shown in FIG. 2.
Figure 2:
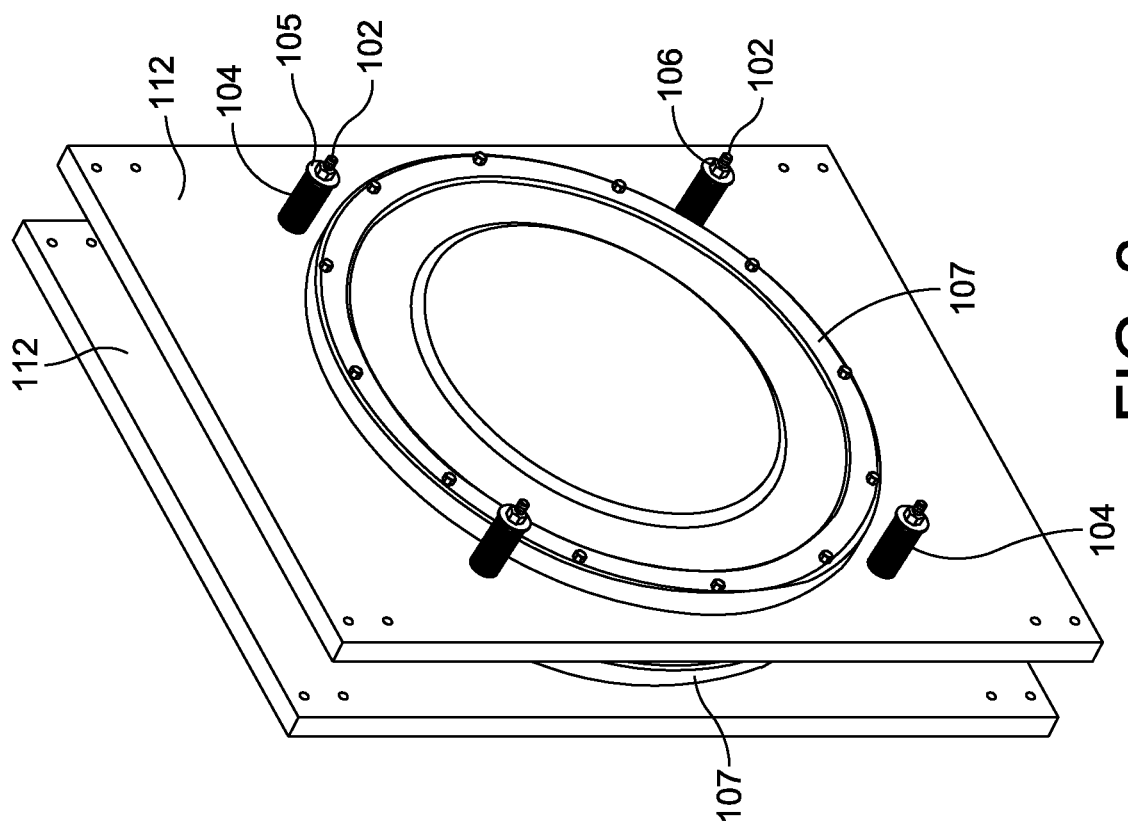
FIG. 2 is a perspective view of an adaptable seismic source of the present invention.

The acoustic output from the various systems used in the seismic survey hydrocarbon exploration industry represents a constant trade off of output frequency spectrums and resolution for the desired application. The combination of frequency output of the source, operating depth in wave lengths or fractions thereof from the sea surface and depth of penetration into the earth under the sea surface or on land create a natural bandpass filter. The frequencies required to get forced through this filter vary depending on the seismic survey application. Traditionally different devices using much different technologies have been used to generate the frequency spectrums required for the various applications. The highly adaptive seismic source of the present invention utilizing the concepts described herein can overcome many of the limitations and provide a broader spectrum of user selectable frequencies. The unique array of the present invention such as shown in FIGS. 2 and 3 with inter-coupling (control rods and springs) of the separate sources allows a much broader range of seismic survey applications utilizing a common acoustic source module.

Figure 4B:
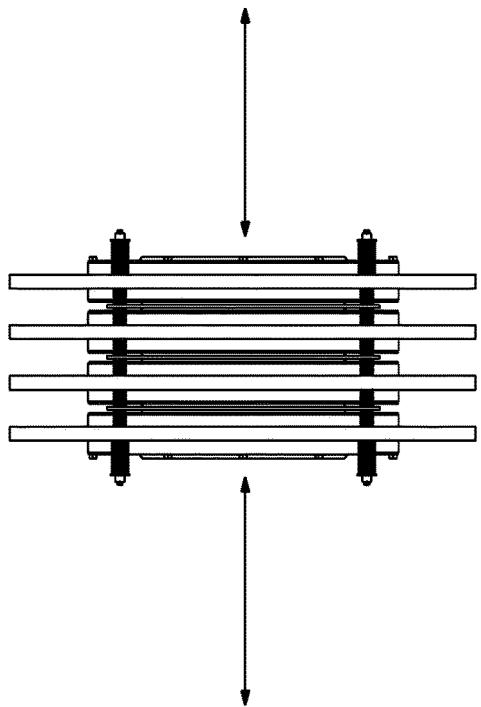
FIGS. 4A through 4D are various examples of the highly adaptable seismic source of the present invention in configurations ranging from two to four elements.
Figure 4D:
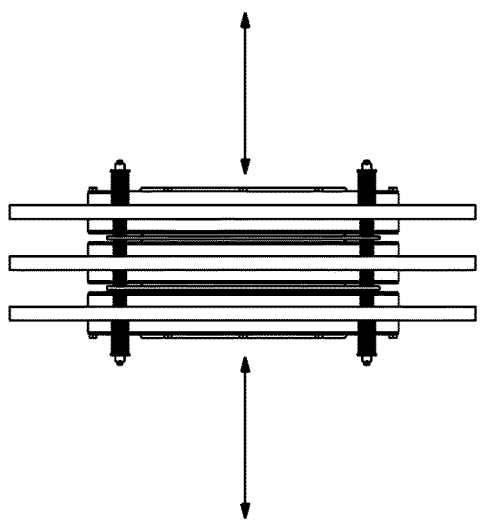
Figure 4A:
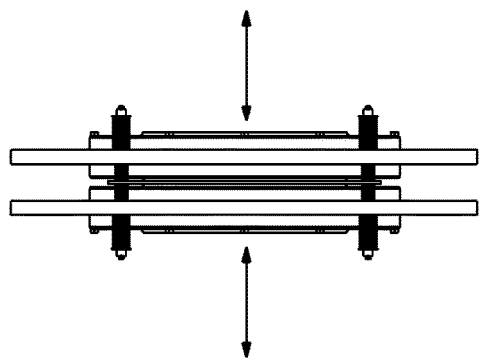
Figure 4C:
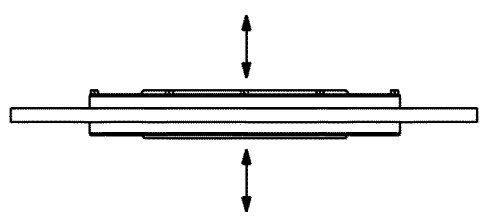

The highly adaptive seismic source of the present invention represents a unique electro-mechanical acoustic source that is a "bubble less" device. The device generates an acoustic impulse pressure wave with a compact and repeatable acoustic signature that can be used for a variety of seismic surveys. This adaptive seismic source can be further employed through the use of stacking the source elements to provide a variable choice of frequency bands based on the desired seismic survey requirements. One such arrangement is shown in FIGS. 2 and 3, but refer also other embodiments such as shown in FIGS. 4B through 4D. FIG. 4A, with no coupling elements (rods and springs), is considered like that shown in U.S. Pat. No. 3,522,862 to Lister.

Figure 1:
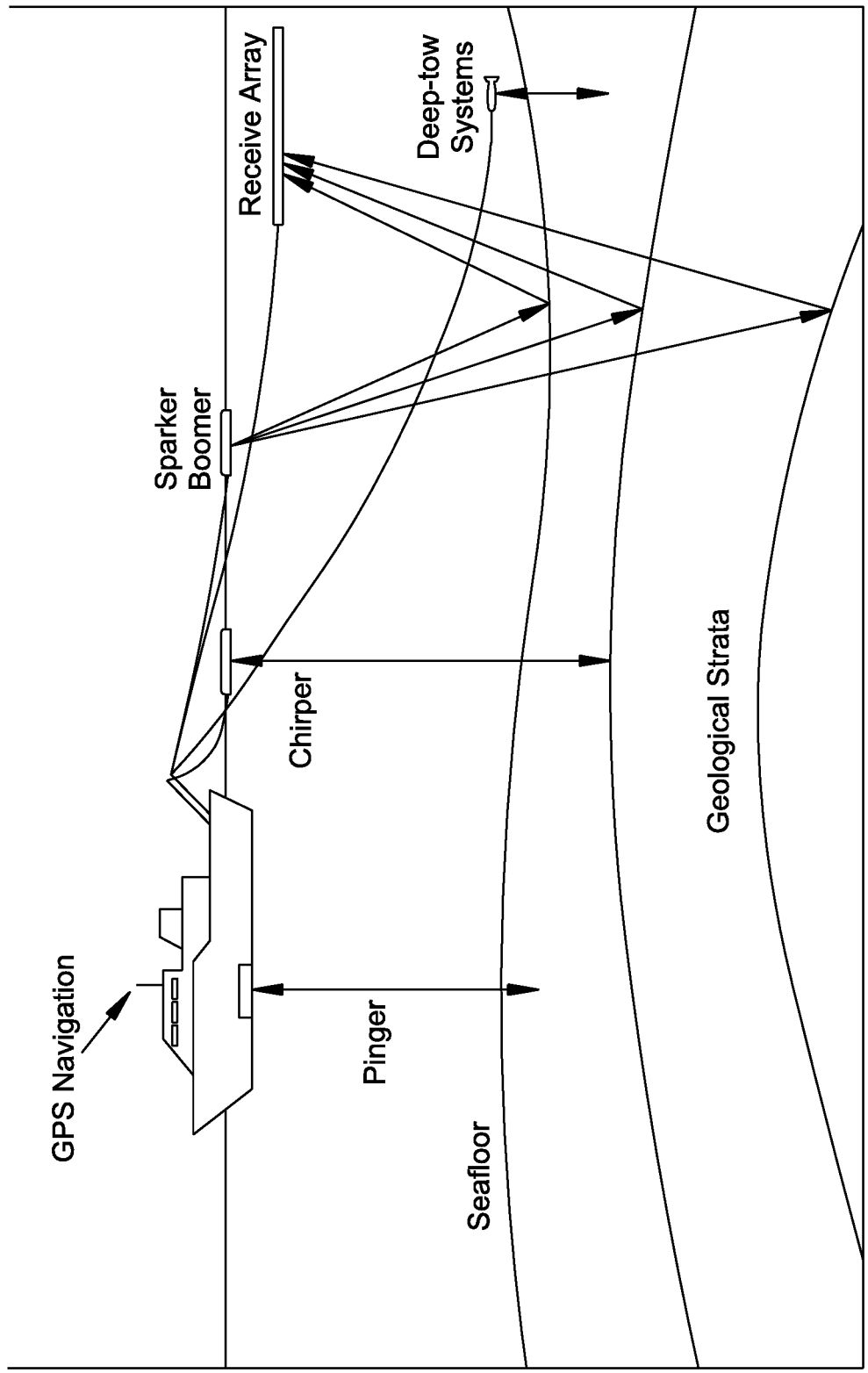
FIG. 1 is an illustration of various shallow water seismic systems.
Figure 5A:
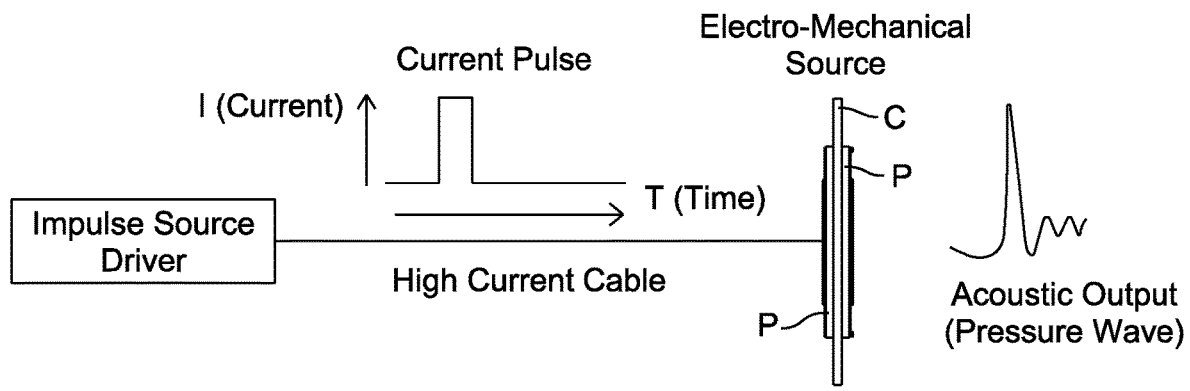
FIG. 5A is more of a system diagram using the adaptive seismic source of the present invention using an input impulse source driver.
Figure 5B:
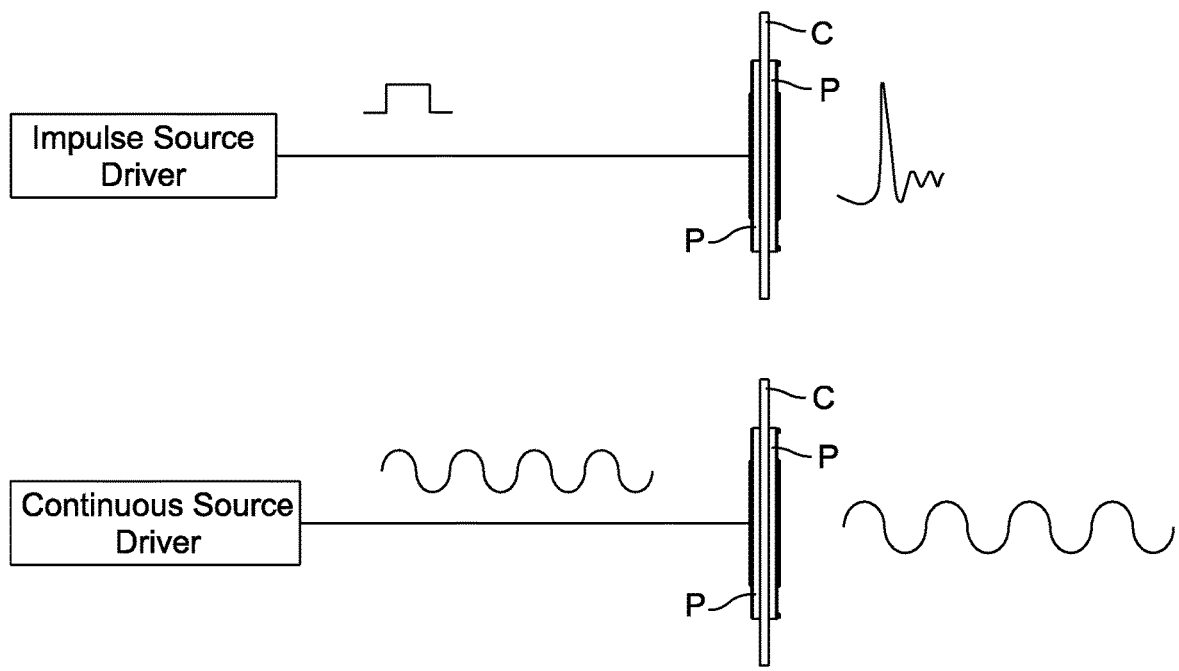
FIG. 5B is a further diagram depicting impulse or linearly-driven modes of operation.
Figure 6:
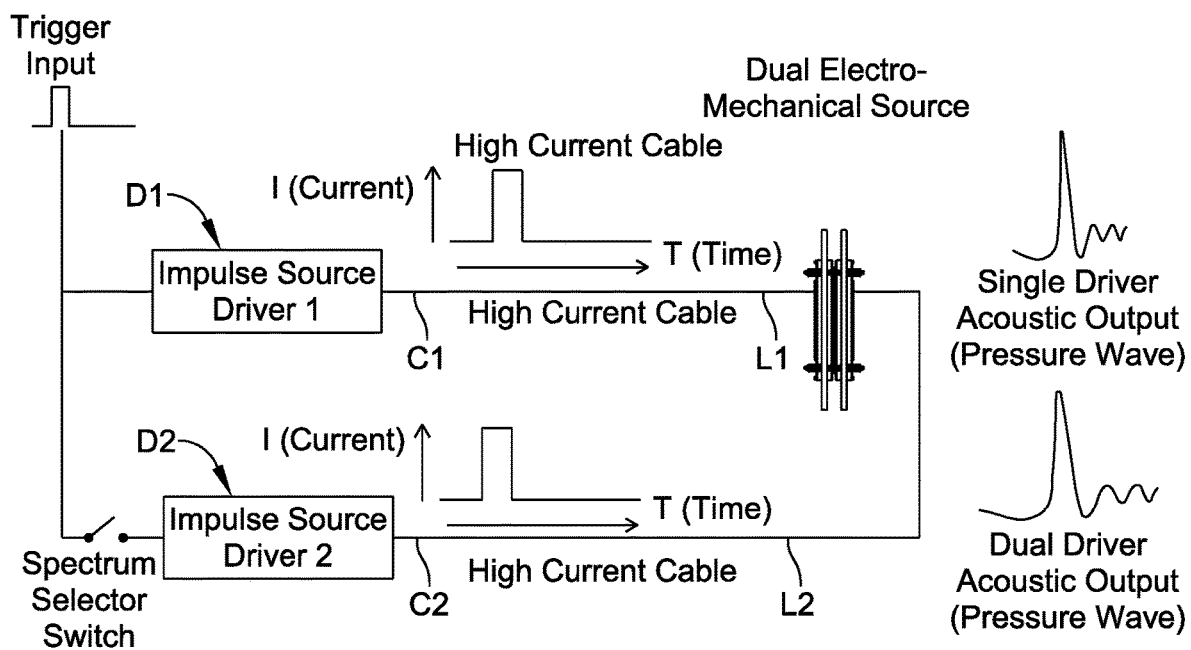
FIG. 6 is a simple diagram that illustrates how the dual seismic array is driven using a selector switch arrangement to obtain a broader frequency response.
Figure 7:
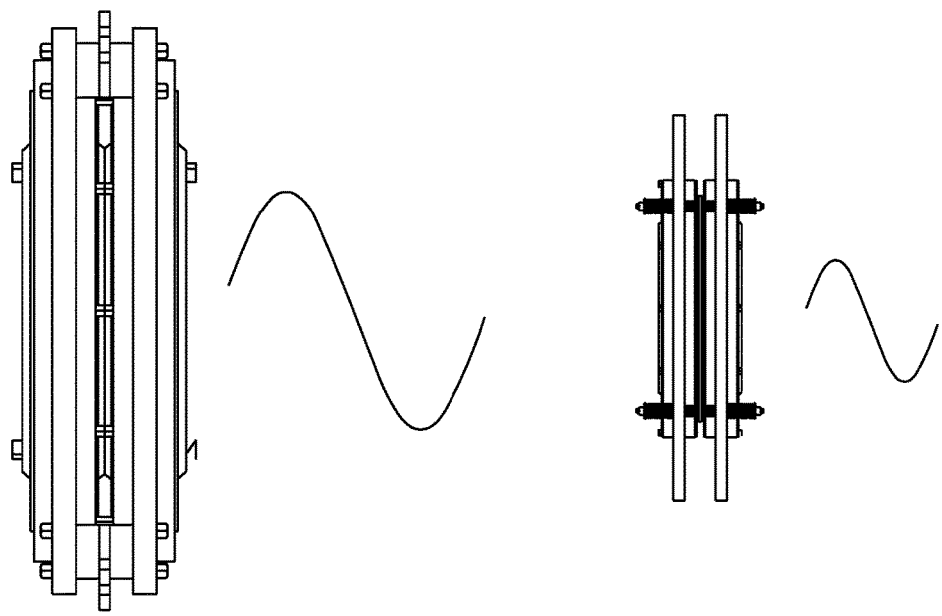
FIG. 7 is a diagram depicting scalability in size, amplitude and frequency of the seismic array.
Figure 8:
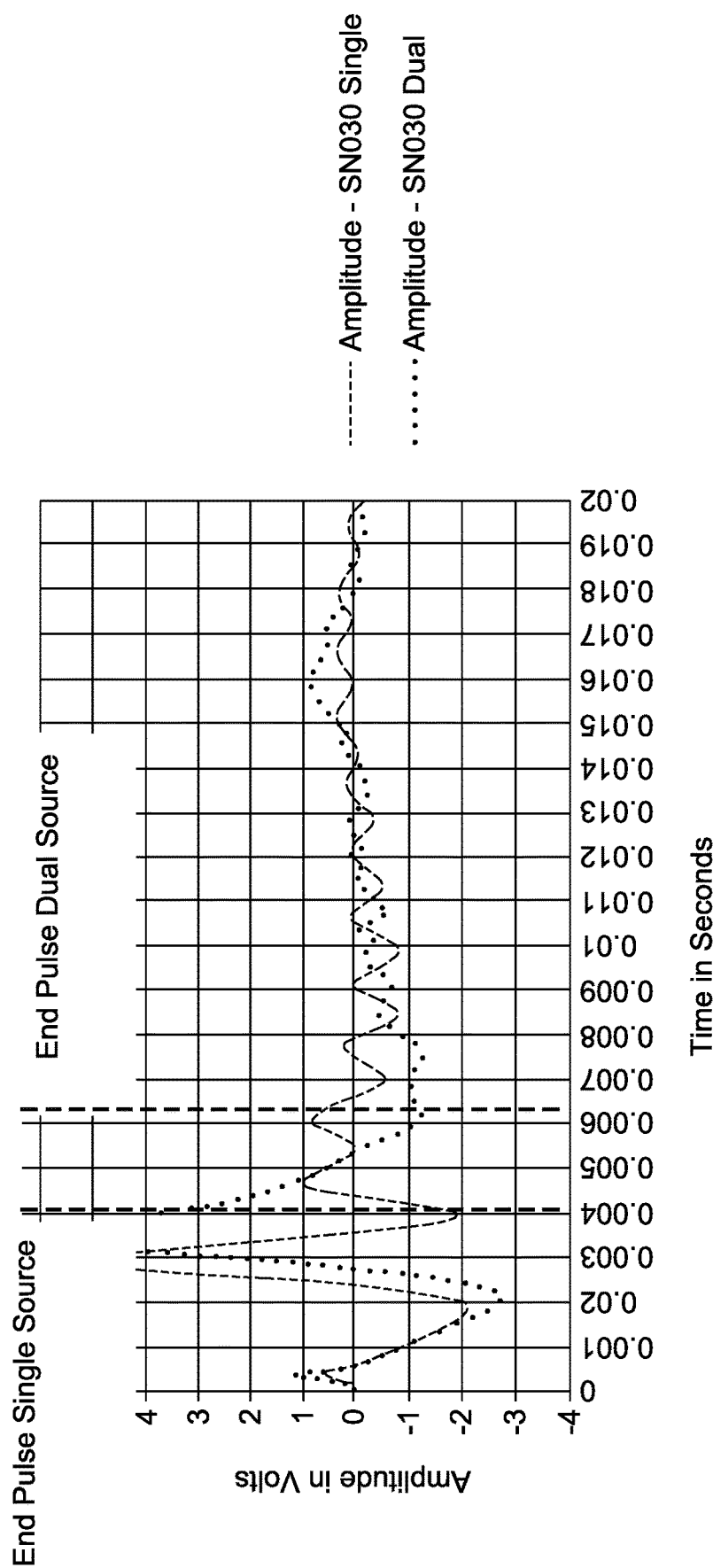
FIG. 8 is a graph example of pulse stretching of coupled source elements.
Figure 9:
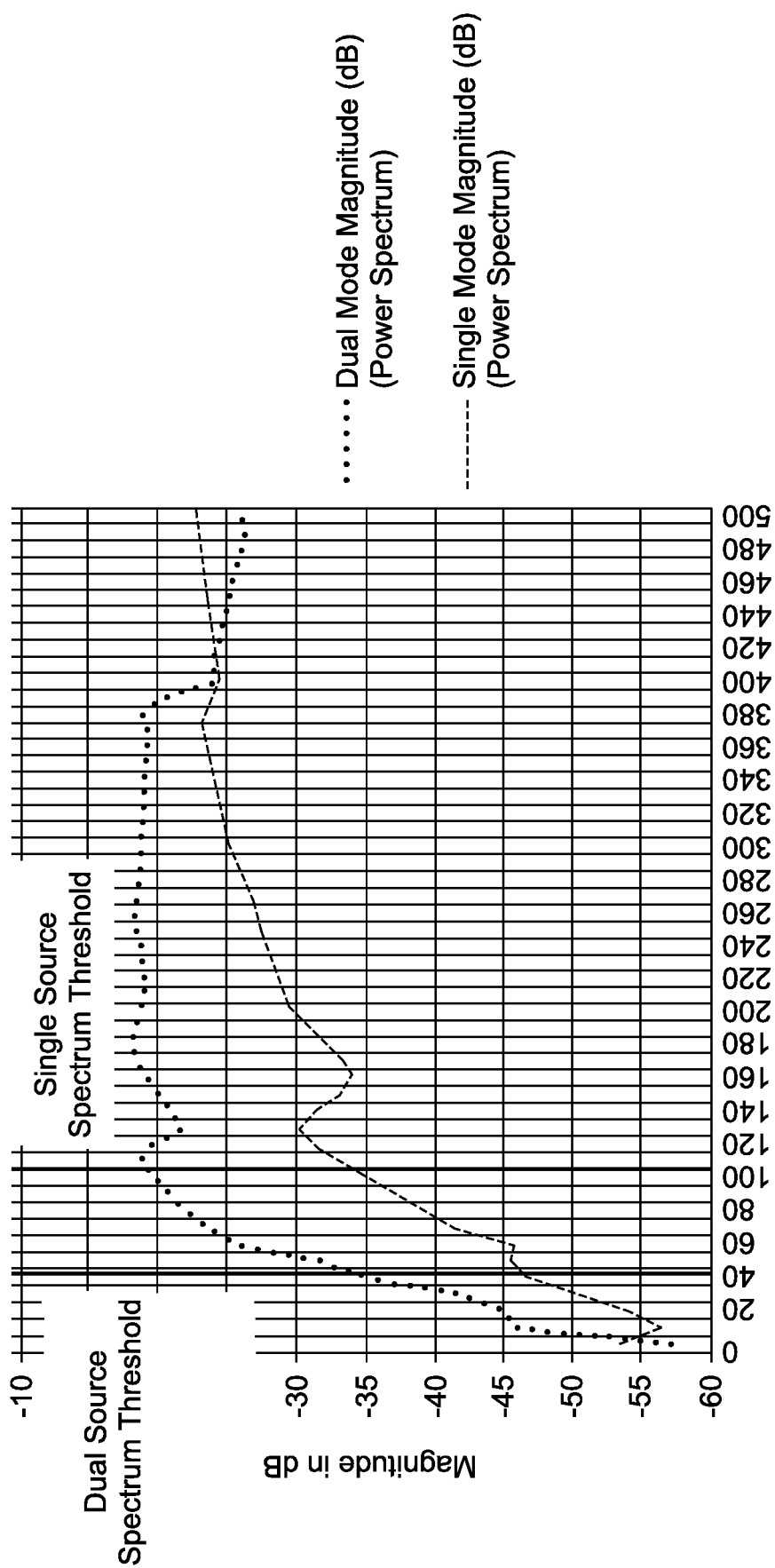
FIG. 9 is a graph example of frequency spectrum output of coupled source elements.
Figure 10B:
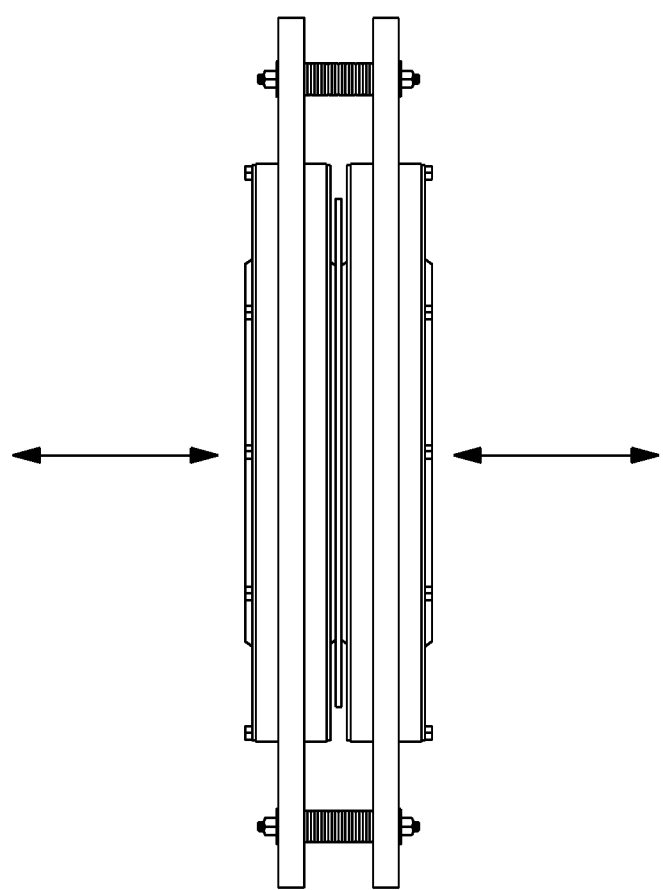
FIGS. 10A and 10B are respective examples of source elements shown in a vertical or horizontal orientation.
Figure 10A:
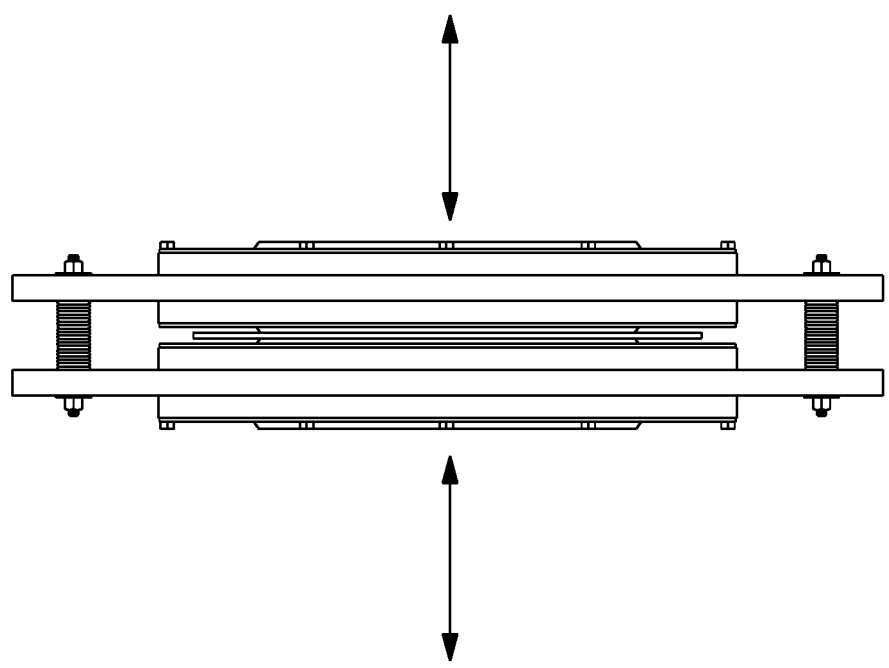
Figure 11:
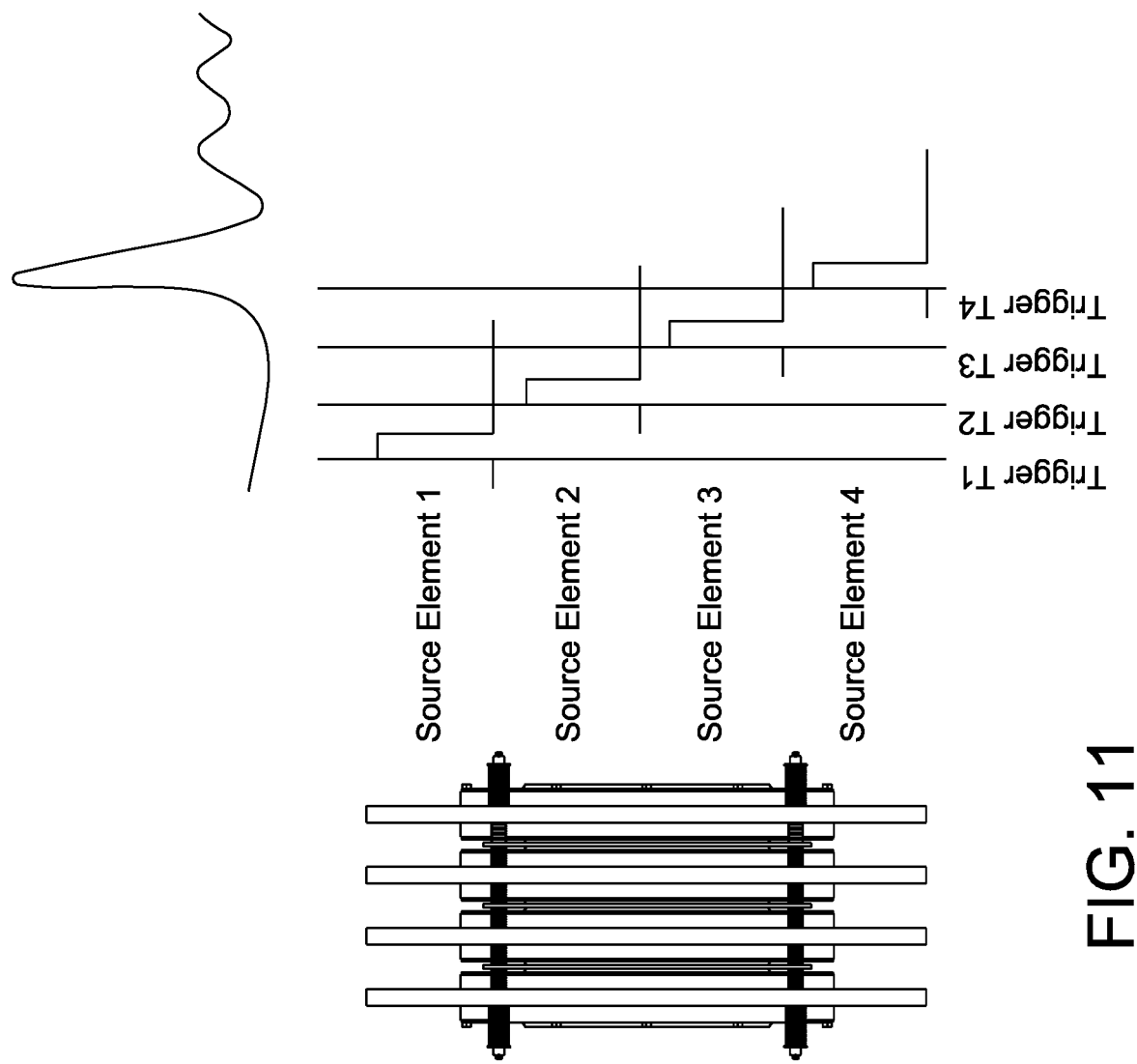
FIG. 11 is another example of respective embodiments of a four source element configuration using synchronous or sequential triggering.
Figure 11:
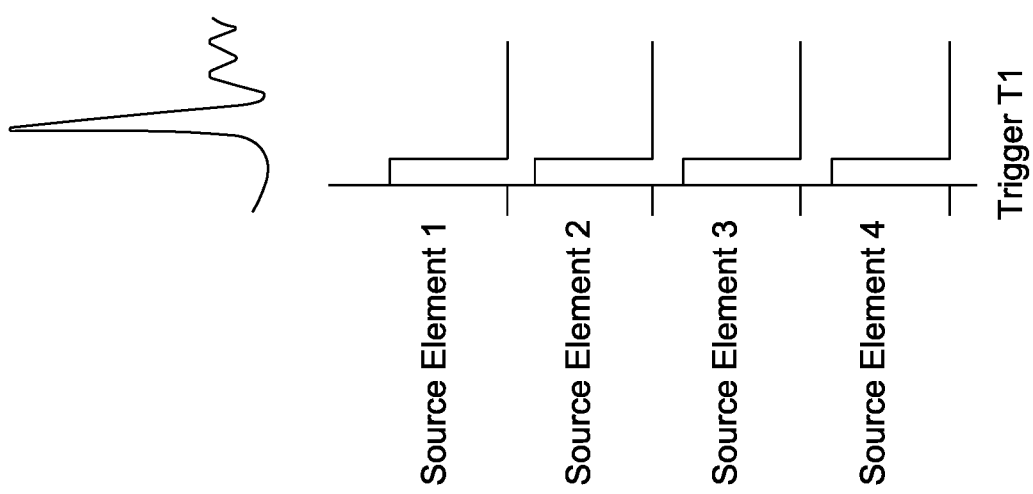
Figure 12:
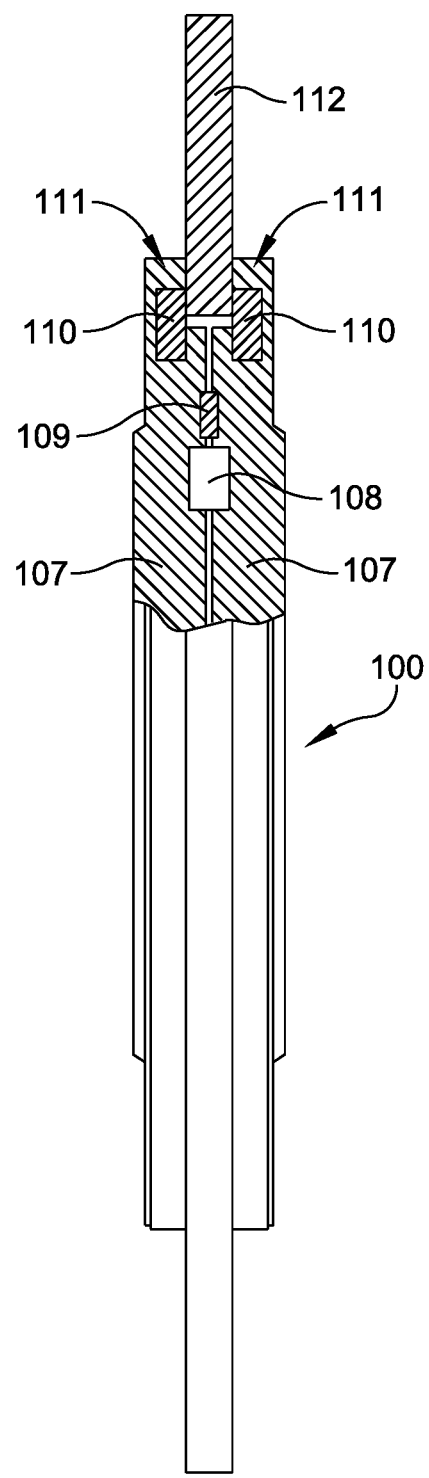
FIG. 12 is a partial cross-sectional view of a single source showing such components as the center plate, dual plates, excitation coil and gasket.
Figure 13A:
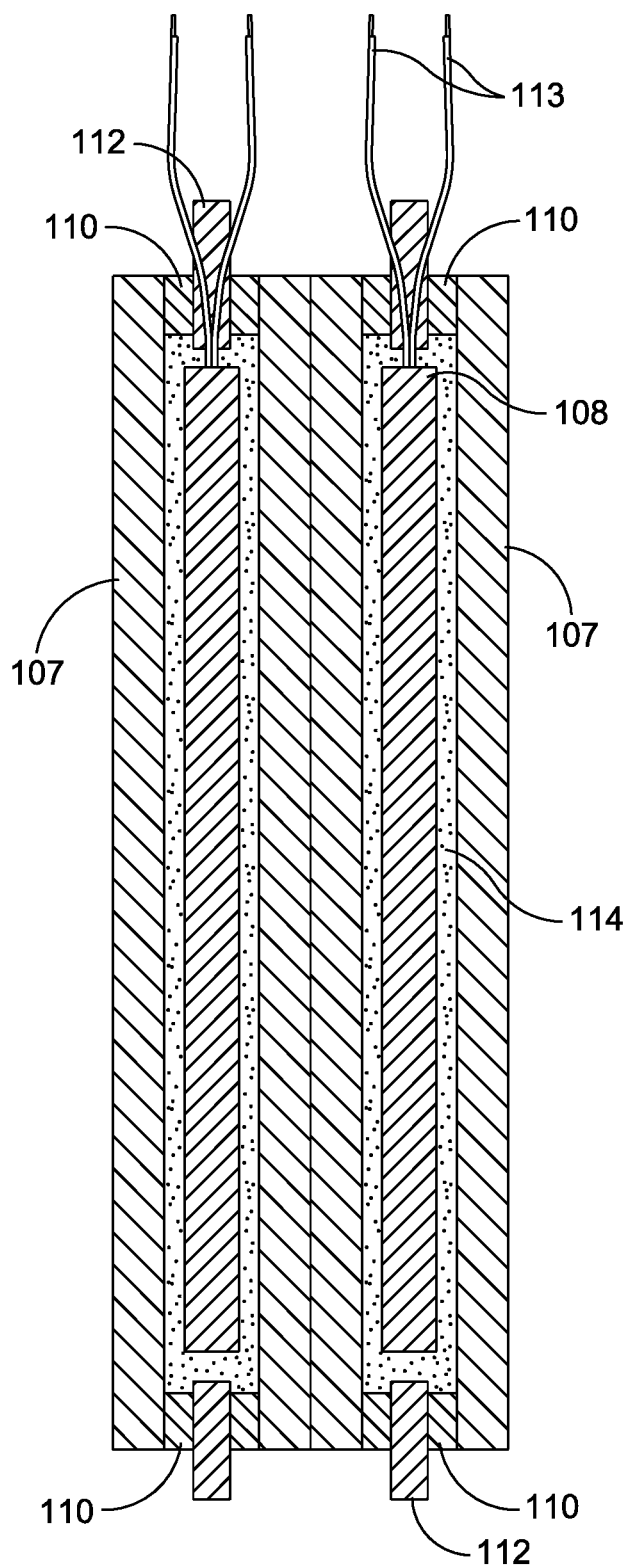
FIGS. 13A through 13C are respective seismic source diagrams showing the operation for at rest, excitation, and excitation release.
Figure 13B:
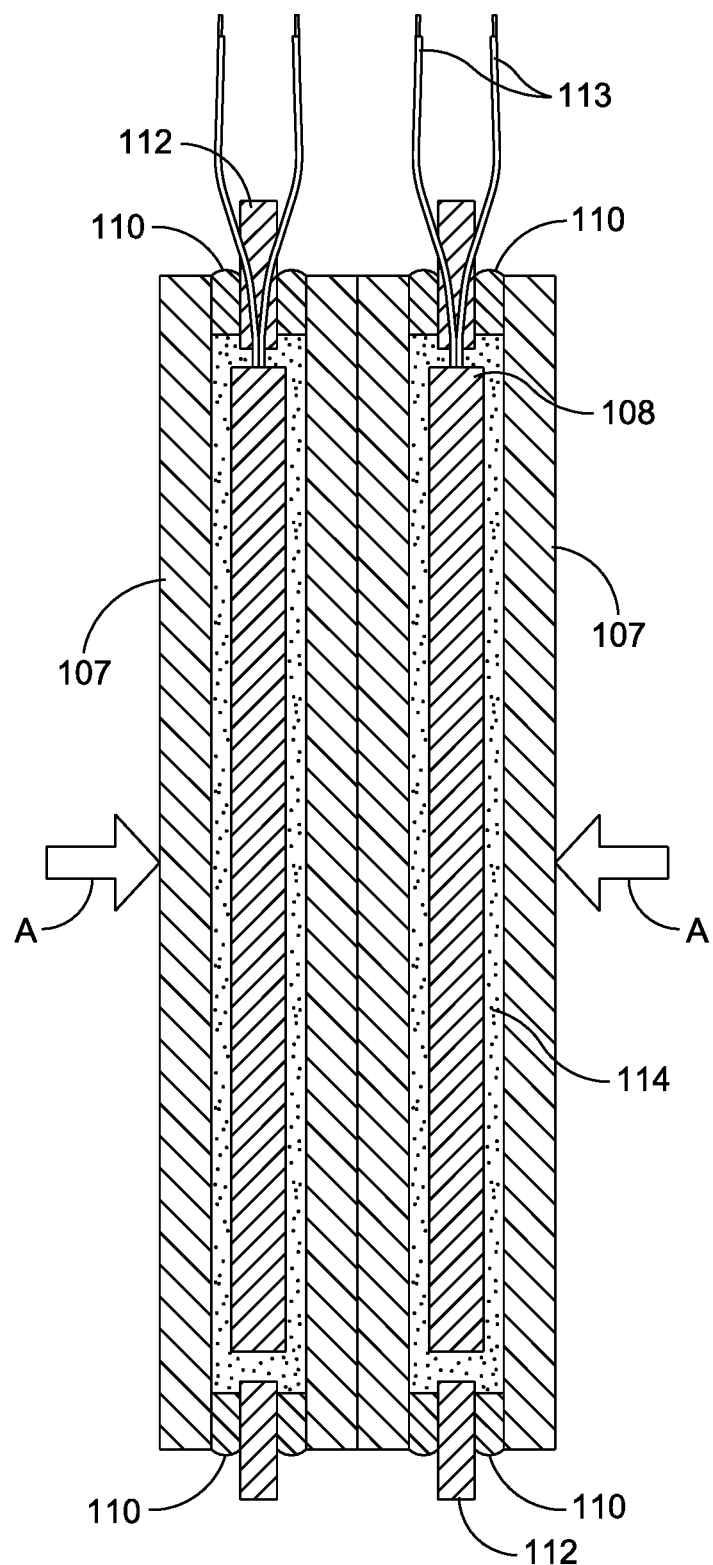
Figure 13C:
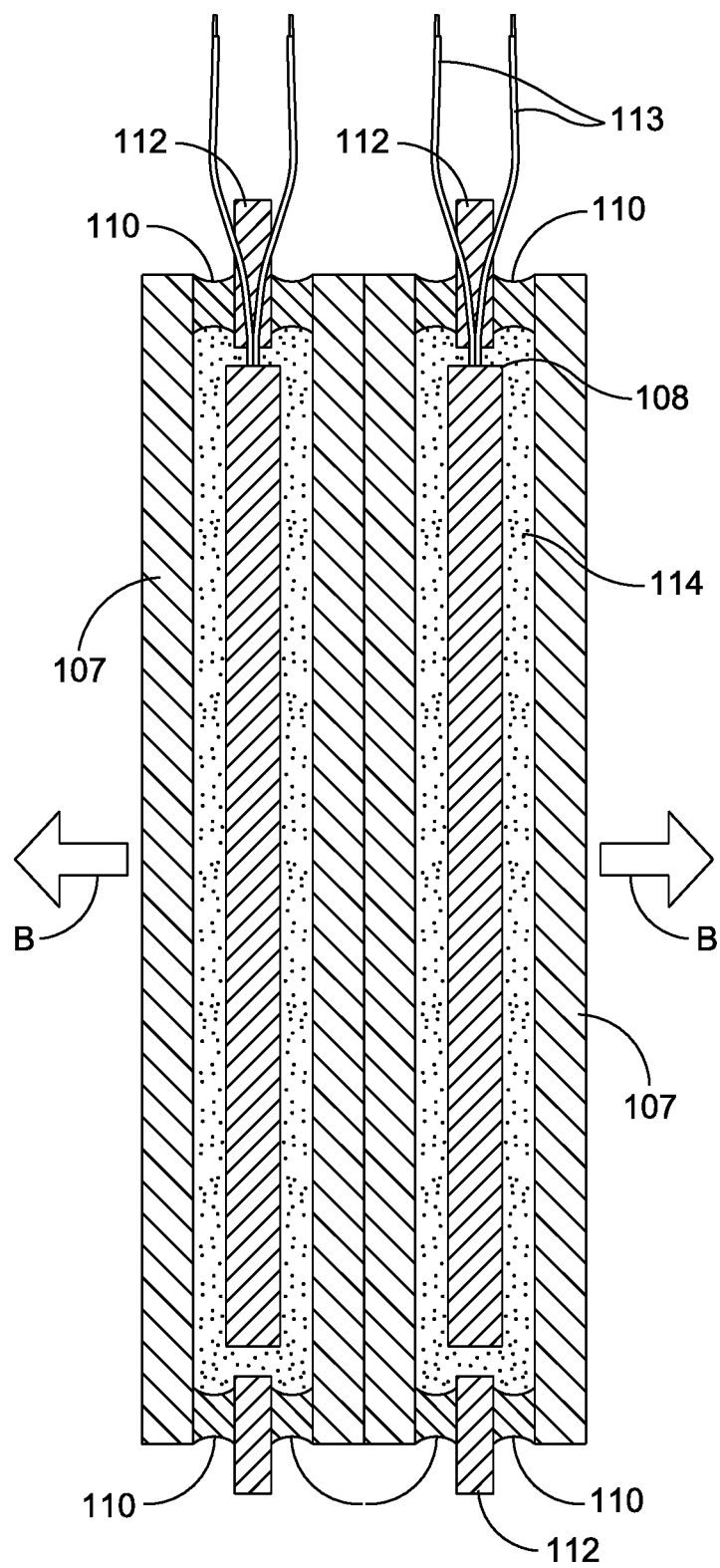
Figure 14:
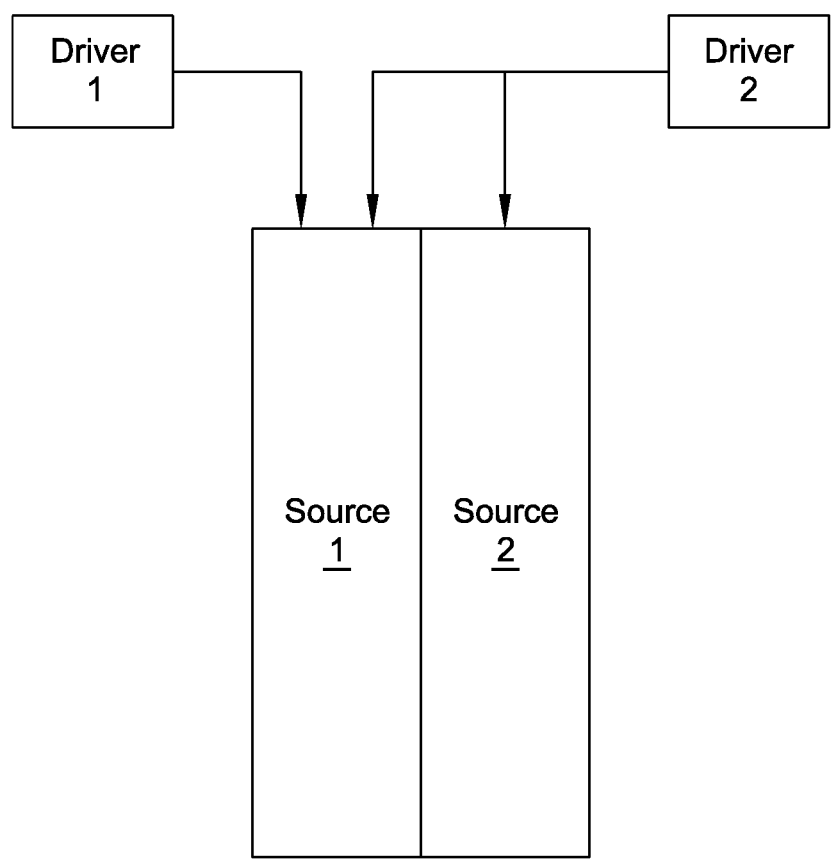
FIG. 14 is a further block diagram illustrating array control.

With reference to the drawings, FIG. 1 is an illustration of various existing shallow water seismic systems. FIG. 2 is a perspective view of an adaptable seismic source of the present invention, while FIG. 3 is a side elevation view of an adaptable seismic source of the present invention as shown in FIG. 2. FIGS. 4A through 4D are various examples of the highly adaptable seismic source of the present invention in configurations ranging from two to four elements;

FIG. 5A is more of a system diagram using the adaptive seismic source of the present invention using an input impulse source driver. FIG. 5B is a further diagram depicting impulse or linearly-driven modes of operation. FIG. 6 is a simple diagram that illustrates how the dual seismic array is driven using a selector switch arrangement to obtain a broader frequency response. FIG. 7 is a diagram depicting scalability in size, amplitude and frequency of the seismic array. FIG. 8 is a graph example of pulse stretching of coupled source elements. FIG. 9 is a graph example of frequency spectrum output of coupled source elements. FIGS. 10A and 10B are respective examples of source elements shown in a vertical or horizontal orientation. FIG. 11 is another example of respective embodiments of a four source element configuration using synchronous or sequential triggering;

FIG. 12 is a partial cross-sectional view of a single source showing such components as the center plate, dual plates, excitation coil and gasket. FIGS. 13A through 13C are respective seismic source diagrams showing the operation for at rest, excitation, and excitation release; and FIG. 14 is a further block diagram illustrating array control. FIGS. 12 and 13A through 13C show the excitation coil at 108 and the input excitation connection or wiring 113 to the coil. Although not shown in FIGS. 13A through 13C it is understood that the support members between the seismic sources are provided in the form of support rods 102, as in FIGS. 2 and 3. Multiple support rods are preferred including at least three support rods and preferably four support rods as depicted in FIG. 2. Each support rod extends between the separate seismic sources and supports the separate seismic sources in a free floating manner so as to be able to transition as depicted in the separate views on FIGS. 13A through 13C. Passage holes are provided in the various components to receive the individual support rods.

The basic operation of one embodiment of the present invention is described with reference to FIGS. 2 and 3. The main components for driving the source are an impulse source driver, a high current interconnection cable and an electromechanical source consisting of two moving outer plates 107 and a fixed center plate 112. A trigger signal is generated either within the source driver or supplied via an external timing device. This trigger signal generates a high current high energy pulse that is sent to the electro-mechanical source via a high current interconnecting cable. In this regard refer, for example, to FIG. 6 which shows high current cables C1 and C2, as well as drivers D1 and D2. In a basic embodiment a single high current cable may be used along with a single driver with dual sources such as shown in FIGS. 13A through 13C. In FIG. 6 the separate excitation lines L1 and L2 connect to separate excitation coils shown schematically as at opposite sides of the plate array. In FIGS. 13A through 13C it is noted that a filler material is disposed about the coil 108. This may be a partially compressible material including a foam material or a fluid material.

The source driver is mounted either on a surface vessel or in a one atmosphere pressure vessel for submerging and mounting near the electro-mechanical source. The high current pulse generates a magnetic field within the source which forces the outer plates of the source inward and toward each other (see FIG. 13B and noted arrows A). When the high energy pulse is cut off, the now stored energy in the compressed volume contained within the source is also released thus forcing the source plates apart creating a positive pressure wave at a much higher amplitude (see FIG. 13C and noted arrows B). The frequency spectrum (see FIG. 9) of the output of the source is a function of the speed and distance traveled, as well as the size of each of the source plates (see FIGS. 2, 3 and 6). The resulting acoustic pressure wave is an extremely repeatable signal and does not suffer from the acoustic pressure variations that "bubble" sources like air guns and sparker type systems inherently have.

The highly adaptive seismic source of the present invention is illustrated in one embodiment in FIGS. 2 and 3. This combines the individual base sources to allow for selectively changing the output frequency spectrum for system use in a broader range of survey requirements. The simplest configuration consists of two source drivers and two electro-mechanical sources as illustrated in FIGS. 2, 3, 6 and 13. The fixed center plates 112 of the two sources are mounted together and allowed to slide on a series of rods 102. A compliant rubber gasket 101 is inserted between the adjacent inner plates 107A of the two sources, as illustrated in FIG. 3.

A set of springs 103, 104 with retaining washers 105 and nuts 106 for force adjustment are on the outer side of each of the fixed center plates 112. This coupling allows the moving plates 107 of the sources to combine with each other. The single spring 103 is a compression spring and is located between the inner plates 107A of the respective sources as noted in FIG. 3. The pair of springs 104 are both tension springs and are located on the outside of the common support plates 112, as noted in FIG. 3. As also illustrated in FIG. 2 there are four support rods used in that embodiment, each outside of the corresponding plates 107. Each of the springs 103, 104 are preferably coil type springs and each is dimensioned and disposed to be about the support (tension and guiding) rod 102.

Referring to the basic system operation, this is illustrated in FIGS. 2, 3, 6 and 13. FIGS. 2 and 3 show two of the source drivers having been triggered and thus a high energy pulse is sent to both of the source plates 107. The resulting magnetic field causes each of the outer plate pairs to compress inward toward each other. Refer to FIG. 13B and the noted arrows A showing this inward compression. The springs 103, 104 on the fixed center plate 112 allow the center plates 112 to move inward sliding on the mounting rods 102. When both of the high energy pulses are cut off the magnetic field collapses and the stored energy in each of the source plates forces the outer plates outward and away from each other. The inner adjacent source plates 107A are forced against one another and this forces the fixed plates 112 outward. The outer plates of the respective sources also are forced outward.

Refer to FIG. 13C and the noted arrows B showing this outward movement. The result is the outer plates of the sources have traveled a greater distance over a longer period of time thus creating a longer wavelength acoustic pressure wave with a lower frequency spectrum (see FIGS. 8 and 9). The system can now generate two distinct frequency spectrums by selecting whether a high energy pulse is sent to one or both of the source plates creating the ability to adapt the system to penetrate further into the seabed and or have a higher resolution for resolving finer details in the sediments thus expanding the seismic applications that the system can be utilized for. This capability can be used to selectively add energy to any number of plates thus driving them for varying speeds and distances. Refer to the various embodiments in FIGS. 4B-4D.

This feature can then be used to generate an adaptive tunable and switchable on the fly system that utilizes several frequency spectrums and also generate a low frequency spectrum that typically was achieved by only "bubble" generating systems and is a truly unique in the seismic and geophysical survey and exploration industry.

FIG. 14 is a simple block diagram that illustrates one embodiment for controlling the separate seismic sources from separate first and second drivers. In one mode driver 1 drives only the seismic source 1, while in another mode driver 2 drives both seismic sources.

The following are additional aspects of the present invention.

The source arrays can be configured into any number of subsets and or into any number of subsets of a larger array typically used in offshore seismic source configurations.

The sources can be depth compensated to produce a constant depth invariable signature.

The depth compensation can be via air, gas or fluid within the source.

The source arrays could be arranged vertically or horizontally in the water column (refer to FIG. 9).

The sources may be used in ocean, coastal and inland water ways as well as on land using natural and manmade coupling configurations.

The installation configurations can be mobile survey configurations or fixed monitoring configurations.

The sources can be triggered simultaneously, sequentially or in other coded sequences (refer to FIG. 10).

The sources can be driven using a triggered discharge mechanism or continuously driven via an amplifier or other linear electrical method (refer to FIG. 5).

The sources could be driven via piezoelectric, electrostatic, electromagnetic, magnetostrictive or electromechanical techniques.

The sources could be fixed mount to the hull of a surface or subsurface vessel.

The source mounting plates can be in a fixed or floating configuration.

The base source plates are scalable to allow changes in the fundamental frequency of the source elements (refer to FIG. 6).

The following reference numbers and descriptions are pertaining to the drawings:
- 100 Bubblegun Plate Assembly
- 101 Mating Material
- 102 Guide/Tension Rod
- 103 Compression Spring
- 104 Tension Spring 105 Tension Plate
106 Retaining Nut
107 Bubblegun Plate
108 Coil
109 Spring Mechanism
110 Gasket
111 Clamping Mechanism
112 Mounting Center Plate
113 External Electrical Connection to Coil
114 Filler Material.

Having now described a limited number of embodiments of the present invention, it should now be apparent to those skilled in the art that numerous other embodiments and modifications thereof are contemplated as falling within the scope of the present invention, as defined by the appended claims.

What is claimed is:

1. A seismic source system comprising:
a first seismic source having at least one moving plate;
a second seismic source also having at least one moving plate;
each of the moving plates of the first and second seismic sources creating a pressure wave;
wherein each seismic source is comprised of a center plate having opposed sides and a pair of movable plates that are arranged at respective opposed sides of the center plate;
and a coupling member that is disposed between the first and second seismic sources for enabling a sliding action between the first and second seismic sources;
a controller coupled with the first and second seismic sources for exciting the seismic sources to provide a combined output with a lower frequency spectrum;
wherein the coupling member is comprised of a plurality of support rods each of which is mounted with a center plate of respective first and second seismic sources;
the respective center plates being constructed and arranged to slide on the plurality of support rods.

2. A seismic source system as set forth in claim 1 wherein each support rod extends through the pair of movable plates of the respective first and second seismic sources.

3. A seismic source system as set forth in claim 1 wherein the coupling between the center plate and the respective movable plates enables the moveable plates to move relative to the center plate.

4. A seismic source system as set forth in claim 1 wherein each seismic source further includes a biasing spring associated with each support rod so as to enable the coupling of energy between the seismic sources.

5. A seismic source system as set forth in claim 4 wherein the plurality of support rods are disposed in a spaced array within a perimeter of the moveable plates.

6. A seismic source system comprising:
a first seismic source having at least one moving plate;
a second seismic source also having at least one moving plate;
each of the moving plates of the first and second seismic sources creating a pressure wave;
wherein each seismic source is comprised of a fixed center plate having opposed sides and a pair of movable plates that are arranged at respective opposed sides of the center plate;
and a coupling member that is disposed between the first and second seismic sources for enabling a sliding action between the first and second seismic sources;
a controller coupled with the first and second seismic sources for exciting the seismic sources to provide a combined output with a lower frequency spectrum;
wherein the coupling member includes a plurality of support rods;
wherein the plurality of support rods are disposed substantially transverse to the moveable plates; and
wherein each seismic source further includes a biasing springs associated with each support rod so as to enable the coupling of energy between the seismic sources.

7. A seismic source system as set forth in claim 6 wherein the biasing springs include both compression and tension springs.

8. A seismic source system as set forth in claim 6 wherein the biasing springs include a single compression spring that is disposed between facing plates of the respective first and second seismic sources.

9. A seismic source system as set forth in claim 8 wherein the biasing springs further include a pair of tension springs that are disposed respectively outboard of each of the first and second seismic sources.

10. A seismic source system as set forth in claim 5 further including an excitation coil for each seismic source.

11. A seismic source system as set forth in claim 10 wherein the excitation coil is disposed within a plane of the fixed center plate.

12. A seismic source system as set forth in claim 11 including a filler material between the moveable plates.

13. A seismic source system comprising:
a first seismic source having at least one moving plate;
a second seismic source also having at least one moving plate;
each of the moving plates of the first and second seismic sources creating a pressure wave;
a coupling member for connecting the first and second seismic sources;
a first driver for driving only the first seismic source to provide from the seismic source a first frequency spectrum and a second driver for driving both the first and second seismic sources in parallel to provide from the seismic sources a second frequency spectrum that is different than the first frequency spectrum; and
a controller coupled with the first and second seismic sources to provide a combined output with a lower frequency spectrum.

14. A seismic source system as set forth in claim 13 wherein the each of the drivers includes an excitation coil and the coupling member extends between the seismic sources.

15. A seismic source system as set forth in claim 14 wherein the coupling member includes a plurality of support rods and coil springs that are disposed about each support rod.

16. A seismic source system as set forth in claim wherein the coil springs include a single compression spring that is disposed between facing plates of the respective first and second seismic sources; and wherein the coil springs further include a pair of tension springs that are disposed respectively outboard of each of the first and second seismic sources.

17. A seismic source system comprising:
an input drive terminal
an array that includes a first seismic source having at least one moving plate and an excitation element, and a second seismic source also having at least one moving plate and an excitation element;

each of the moving plates of the first and second seismic sources creating a pressure wave;

a coupling member for physically connecting the first and second seismic sources;

a first source driver;

a second source driver; and a source selector that is disposed in series with the second source driver for either coupling the input drive to the second source driver or impeding the input drive to the second source driver.

18. A seismic source system as set forth in claim 17 wherein the input terminal receives a trigger input and each of the source driver is an impulse source driver.

19. A seismic source system as set forth in claim 18 wherein, in one mode, the input trigger signal excites only the first seismic source; and in another mode, the input trigger signal excites both the first and second seismic sources.

\* \* \* \* \*